United States Patent Office 3,208,186
Patented Sept. 28, 1965

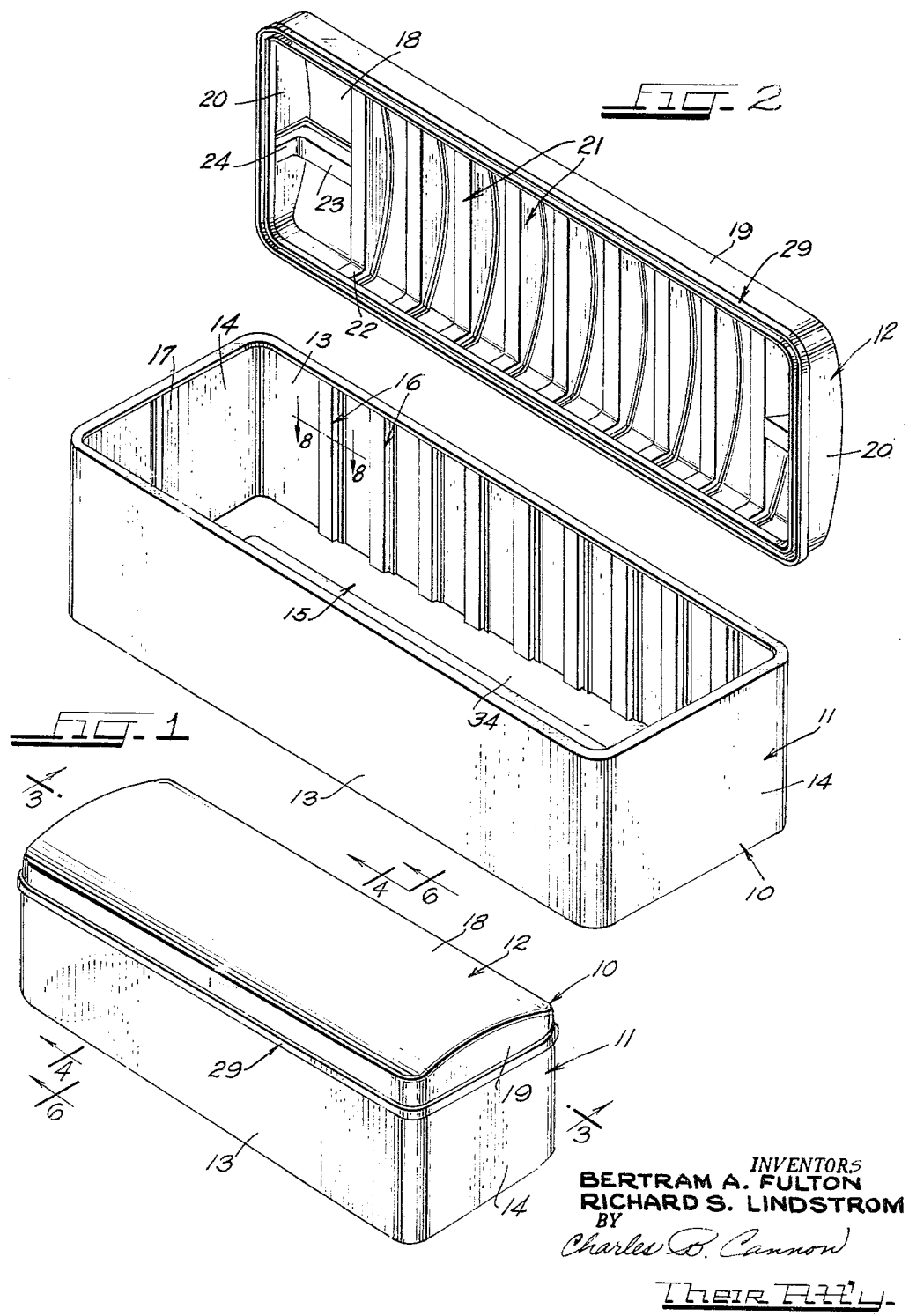

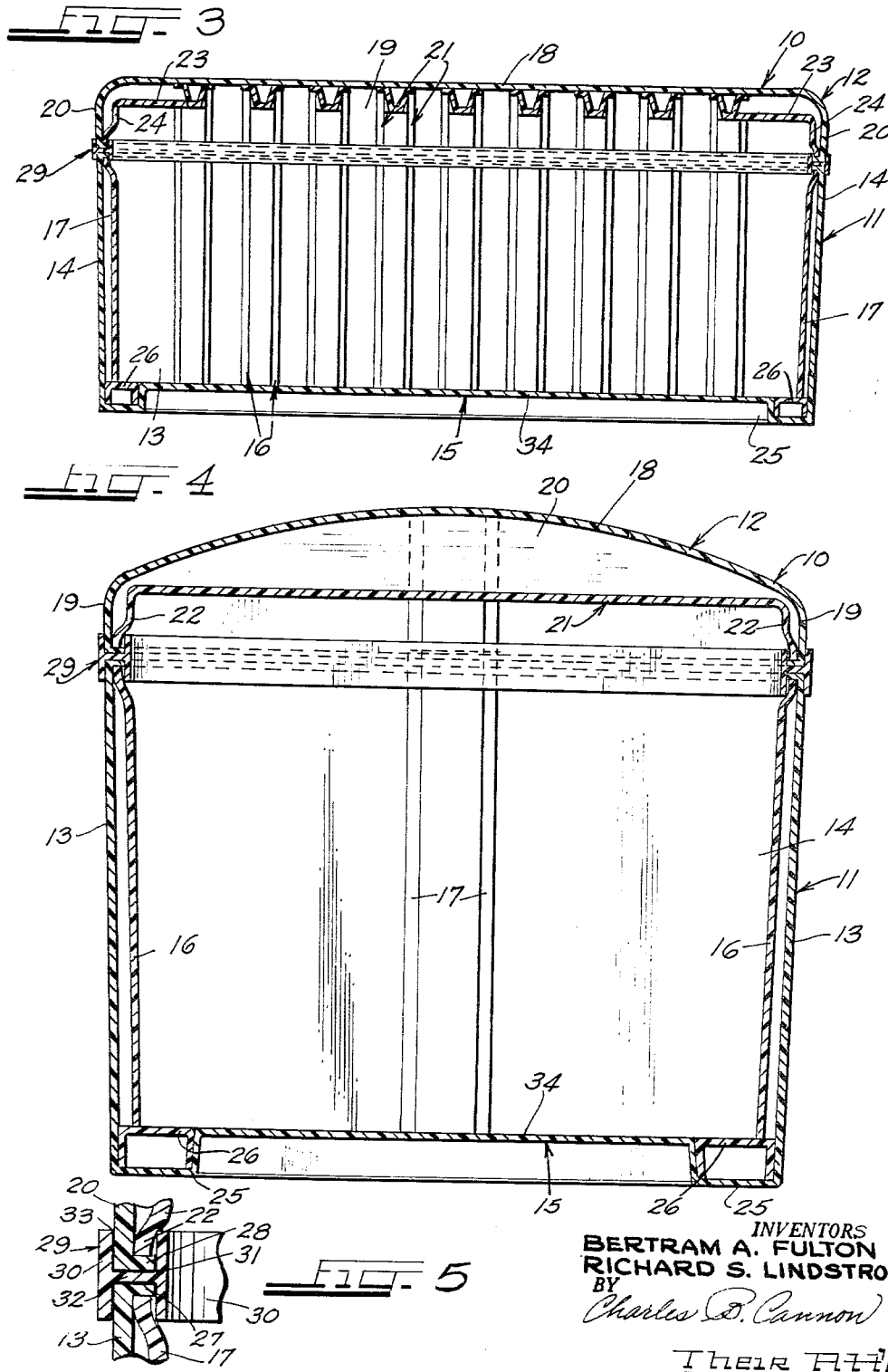

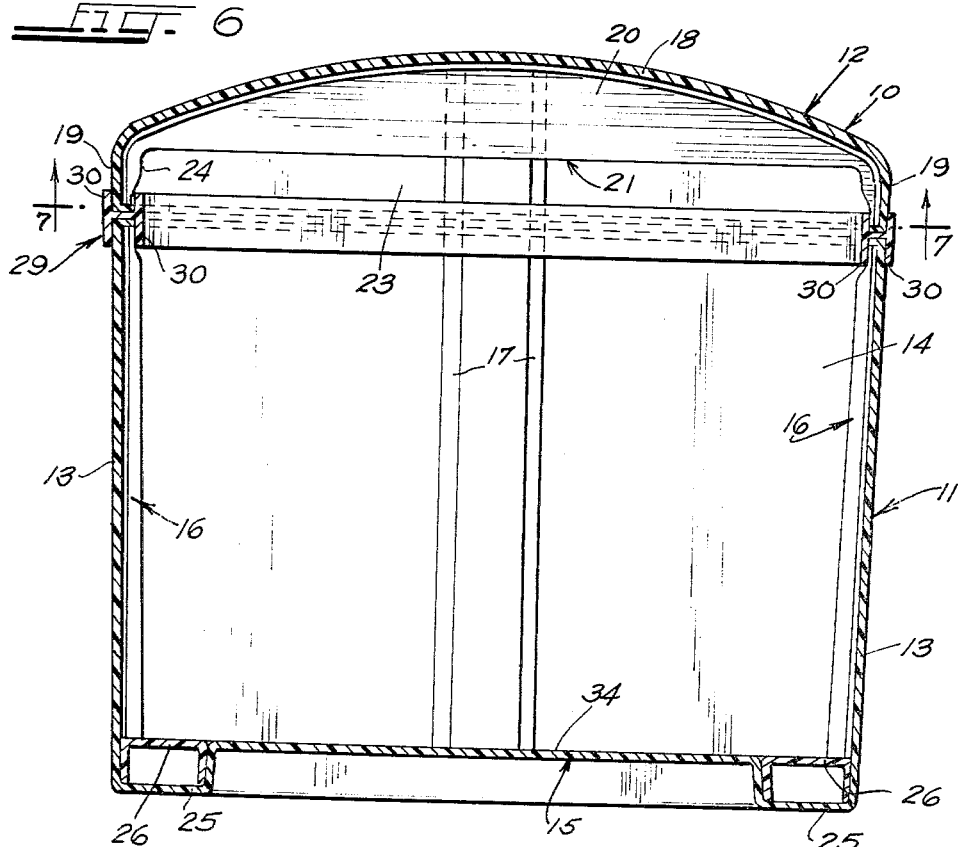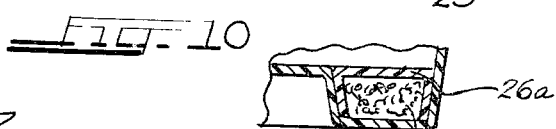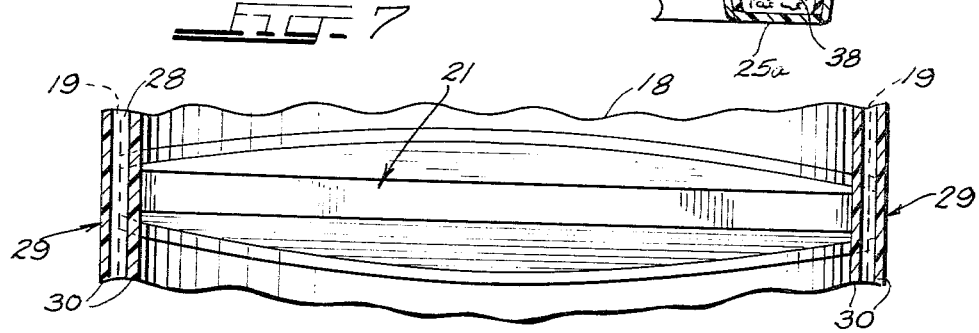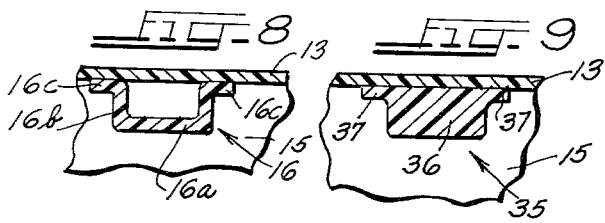

3,208,186
BURIAL VAULTS
Bertram A. Fulton, Lynnfield, and Richard S. Lindstrom, Reading, Mass., assignors, by mesne assignments, to Wilbert W. Haase Co., Broadview, Ill., a corporation of Illinois
Filed Nov. 13, 1962, Ser. No. 237,253
7 Claims. (Cl. 52—140)

This invention relates to burial vaults.

More specifically, this invention relates to burial vaults of the type which may be made of synthetic plastic resinous materials, such as those hereinafter described, and other suitable materials.

Various attempts have been made heretofore to make ligthweight burial vaults of synthetic plastic resinous materials, but it has been found that most, if not all, of such lightweight prior burial vaults made of synthetic plastic resinous materials have lacked adequate structural or flexural strength to withstand the earth pressure thereon in the grave opening, and the weight of earth-handling machinery moving thereover, or have lacked adequate resistance to the corrosive action of the chemical components in the soil and water in the grave opening, or have been otherwise objectionable.

Accordingly, an object of the present invention is to provide a new and improved lightweight burial vault which may be made of synthetic plastic resinous materials and which has adequate structural flexural strength to resist the crushing forces of the overlying earth in the grave opening and the weight of earth-handling machinery moving thereover.

An additional object of the present invention is to provide a new and improved lightweight burial vault made of synthetic plastic resinous materials and which possesses adequate resistance to the corrosive or deteriorating chemical effects of soil components in the grave opening to withstand such corrosive or deteriorating chemical action for a prolonged period of time.

A further object of the invention is to provide a novel construction for reinforcing the side and end walls of the base and the side and end walls of the cover of the new burial vault.

Still another object of the invention is to provide a new and improved top seal burial vault made of lightweight plastic resinous material such, for example, as glass fiber-reinforced polyester resin, and which is so designed and constructed that all of the outer surfaces of the vault which are exposed to the soil when in a grave opening are smooth gel resin molded surfaces formed against the mold and which are, therefore, well protected with a smooth non-porous surface of the resinous material employed in making the vault, or other resin, thereby preventing any of the glass fiber reinforcing material from protruding through the resinous surface of the vault and thus increasing the resistance of the outer surface of the vault to deterioration by the chemical action of the soil components and other materials when the vault is in a grave opening.

An additional object of the invention is to provide a novel construction for the base of the new burial vault which is effective to prevent puncturing of the bottom wall of the base in the event that the vault should rest upon small stones, pebbles, or like objects, at the bottom of the grave opening.

A further object of the invention is to provide a novel construction in the base of the new burial vault which provides a supporting surface for the base of the vault which, at the same time, provides increased rigidity in the base of the new burial vault, both longitudinally and laterally thereof.

An additional object of the invention is to provide a new and improved sealing construction for sealing the joint between the box-like body portion or base and the cover member of the new burial vault.

Still another object of the invention is to provide a new and improved burial vault which is so designed and constructed that it has a substantially smooth and uninterrupted outer surface with a minimum of overhanging and protruding parts to enable maximum utilization of grave space while, at the same time, minimizing the possibility of damage to the vault during digging of an adjacent grave opening by power digging equipment when the vault is in a grave opening.

An additional object of the invention is to provide a new and improved top seal burial vault made of lightweight plastic resinous material having a smooth non-porous outer surface of gel resin which substantially enhances the resistance of the walls of the vault to deterioration under the action of the soil components when the vault is in a grave opening.

Other and further objects of the present invention will be apparent from the following description and claims and are illustrated in the acocmpanying drawings, which by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention.

In the drawings:

FIG. 1 is a perspective view of a burial vault embodying the present invention;

FIG. 2 is an exploded perspective view of a burial vault embodying the present invention, showing the cover separated from the box-like body portion or base of the vault;

FIG. 3 is an enlarged central longitudinal vertical sectional view, on line 3—3 of FIG. 1, showing the internal construction of the new burial vault and the reinforcing members embodied therein;

FIG. 4 is an enlarged transverse vertical sectional view on line 4—4 in FIG. 1;

FIG. 5 is an enlarged fragmentary sectional view illustrating the new joint construction and sealing arrangement between the cover and the box-like body portion or base of the new burial vault;

FIG. 6 is an enlarged transverse vertical sectional view on line 6—6 in FIG. 1;

FIG. 7 is a transverse bottom sectional plan view on line 7—7 in FIG. 6;

FIG. 8 is an enlarged transverse sectional view on line 8—8 in FIG. 2;

FIG. 9 is a fragmentary sectional view illustrating a modified form of the reinforcing members which are embodied in the base and cover of the new vault; and FIG. 10 is a fragmentary sectional detail view of a modification of one feature of the invention.

A preferred embodiment of the present invention is illustrated in FIGS. 1 to 8, inclusive, of the drawings, where it is generally indicated at 10, and includes a box-like body portion or base 11 and a cover unit or member 12, both of which may be made of suitable lightweight synthetic plastic resinous material such, for example, as glass fiber-reinforced polyester resin applied in the form of successive layers of the material by the spray-up method, to suitable molds embodying the design of the box-like body portion or base 11 and the cover 12, or by means of other suitable molding techniques, or otherwise. When so molded the entire outer surface of the new vault is smooth and is provided with a smooth non-porous surface of gel resin which enhances the resistance of the walls of the vault to deterioration under the action of the soil components when the vault is in a grave opening.

The box-like body portion or base 11 of the new burial vault 10 includes side walls 13, end walls 14 and a bottom wall 15 which includes a raised central arranged horizontally extending portion 34 (FIGS. 2, 3, 4 and 6). As shown in the drawings (FIGS. 3, 4 and 6) the side walls 13 are parallel to each other in a horizontal plane as are the end walls 14, but diverge slightly outwardly from their lower ends to their upper ends to provide the necessary draft required to release the parts from the mold during fabrication.

The box-like portion or base 11 has a plurality of spaced reinforcing members or ribs 16 upon the side walls 13 on the inner surface thereof. Similarly, each of the end walls 14 of the base 11 may have a similar reinforcing rib or member 17 on its inner surface and centrally thereof. These reinforcing members or ribs 16 and 17 are shown as being hollow and generally channel-shaped wall structures and provide adequate structural flexural strength to the side and end walls 13 and 14 of the base 11 to resist the crushing and bending forces of earth loads in the grave opening and the weight of earth-handling machinery passing thereover. In addition, they provide adequate flexural strength to resist the outwardly bending or flexing action which occurs when another grave opening is dug adjacent the grave opening in which the new burial vault may be interred and the support of the earth normally bearing against the side and end walls of the interred vault is thus removed. However, if desired the reinforcing members 17 and 16 may be formed as solid bodies of suitable material such, for example, as uni-directional glass roving impregnated with a suitable resin such as, for example, polyester resin, such as used in the manufacture of the base 11 and cover member 12 of the vault.

Each of the reinforcing members or ribs 16 includes a main central body portion 16a having a pair of side wall portions 16b extending therefrom and each of these side wall portions 16b terminates at its outer edge in a flange portion 16c which is joined to the adjacent inner surface of the side 13 of the base 11, as best shown in FIG. 8. In the practice of the present invention the reinforcing members or ribs 16 and 17, whether hollow or solid in form, may be molded integrally with the side walls 13 and end walls 14, respectively, of the base 11, and of the same materials employed in making the base 11 and cover 12 of the new burial vault, as above described, or of other suitable or equivalent lightweight synthetic plastic resinous materials or, if desired, the hollow reinforcing members 16 and 17 may be formed separately and adhesively attached to the side walls 13 and 14, respectively, of the base 11, by means of any suitable adhesive.

The cover member 12 includes a top wall 18, side walls 19, and end walls 20, and the cover member 12 also includes a plurality of spaced parallel reinforcing members or ribs 21 which extend across the top wall 18 of the cover member 12, on the bottom surface thereof, with portions 22 thereof extending down the insides of the side walls 19, as shown. Likewise, the cover member 12 includes two longitudinally extending reinforcing members or ribs 23, one of which extends from each of the outermost transverse reinforcing members or ribs 21 to the adjacent end wall 20 with a portion 24 thereof extending down the inside surface of each end wall 20, centrally of the latter, as shown in FIG. 2. These hollow reinforcing members or ribs 21 and 23 in the cover member 12 are substantially similar in construction to the spaced reinforcing members or ribs 16 and 17 in the base 11 and differ therefrom only in design and shape to conform to the design and shape of the cover member 12, and they may be either molded as integral parts of the cover member 12 or molded separately and adhesively attached by means of any suitable adhesive, to the cover member 12, as described above in connection with the reinforcing members or ribs 16 and 17, in the base 11. Likewise, while these reinforcing members or ribs 21–23 are shown as being hollow and generally channel-shaped in form, they may, if desired, be formed as solid bodies of suitable material as described above in connection with the reinforcing members 16 and 17.

One of the problems involved in the use of burial vaults made of lightweight resinous materials is the fact that the bottom wall of such a lightweight burial vault may be punctured under the crushing weight of the overlying earth load in the grave opening or with the added weight of earth handling machinery moving thereover, if the bottom wall of the vault should be deposited upon or rest upon sharp-edged small stones or pebbles on the bottom of the grave opening. To overcome this difficulty, and to prevent the new burial vault from being damaged under such circumstances, the raised centrally arranged portion 34 of the base 11 is provided on the bottom surface thereof and along the marginal side and end edges thereof with hollow and generally channel-shaped longitudinally and laterally extending supporting members or feet 25 which are molded or otherwise formed integrally in and as a part of the raised centrally arranged portion 34 of the bottom wall 15 of the box-like body portion or base 11 of the vault at the outer side and end portions thereof. These hollow and generally channel-shaped supporting members or feet 25 are separated and sealed from the interior of the base 11 of the vault by means of generally inverted U-shaped or channel-shaped members 26 (FIGS. 3, 4 and 6), which are preferably formed of the same material as the base 11 of the vault 10, and may be adhesively or otherwise secured in the channel-shaped supporting members or feet 25, as desired.

The upper end portion of each of the side walls 13 and end walls 14 of the box-like portion or base 11 of the new burial vault 10 has an inwardly extending horizontal flange portion 27 formed thereon and, similarly, the lower portion of each of the side walls 19 and end walls 20 of the cover member 12 of the new burial vault 10 has an inwardly extending horizontal flange 28 formed thereon, as best shown in FIG. 5. The formation of these flanges 27 and 28 as integral parts of the side walls 13 and end walls 14 of the box-like portion or base 11 and the formation of the flanges 28 as integral parts of the side walls 19 and end walls 20 of the cover member 12 is one of the novel features of the present invention and as accomplished by the use of a removable flange on the mold.

One of the problems encountered in the use of lightweight synthetic plastic resinous burial vaults, as distinguished from the heavier concrete burial vaults, in which the relatively great weight of the cover tends to enhance the sealing union between the cover and the base of the vault, is the problem of adequately sealing the cover member to the box-like body portion or base of the vault in such a manner as to prevent the ingress of water and other fluid soil components between the cover and the base of the vault. To solve this problem and to provide an adequate seal between the box-like body portions or base 11 and cover member 12 of the new lightweight burial vault 10, the present invention provides, in one embodiment thereof, an H-shaped sealing unit or member 29 which may either be molded integrally with the new burial vault or, alternatively, may be formed of a separate unit which may be made of either lightweight metal, such as aluminum, or of a thermoplastic resin such, for example, as high impact polystyrene, acrylonitrile-butadienestyrene terpolymer, rigid polyvinyl chloride, polyethylene, or polypropylene, which may be extruded as an H-section, and later shaped to form the corner angles of the base 11 by heating and bending on a hot die, or it may be formed of a synthetic thermosetting resinous material, such as a glass fiber-reinforced polyester resin, or other thermosetting resinous material. This sealing unit or member 29 includes two spaced parallel side walls 30 and an interconnecting web portion 31 which extends between the side wall portions 30 midway between the top and bottom edges thereof, as best shown in FIG. 5.

In the manufacture of the new lightweight synthetic resinous burial vault, in those instances in which the sealing unit or member 29 is formed as a separate unit, it may be secured and hermetically sealed to the upper edge portions of the side walls 13 and end walls 14 of the box-like body portion or base 11 of the vault 10, by means of a suitable adhesive sealing material such, for example, as an epoxy resin, polyester resin, asphalt sealing material, or the like 32, which may be arranged between the top surface of the horizontal flange 27 of the side and end walls 13 and 14 of the box-like body portion or base 11 and transversely extending web portion 31 of the sealing unit or member 29 and between the inner surfaces of the side walls 30 of the sealing unit or member 29 and the outer surfaces of the upper end portions of the side walls 13 and end walls 14 of the box-like body portion or base 11 of the vault 10, as shown in FIG. 5. The sealing of the cover member 12 to the box-like body portion or base 11 of the new vault 10 may be completed by providing a suitable plastic water-resistant sealing material 33 between the upper surface of the horizontally extending web portion 31 of the sealing unit or member 29 and the bottom surface of the horizonal flange 28 on the bottom of the side walls 19 and end walls 20 of the cover member 12, and between the outer surface of the lower edge portions of the side walls 19 and end walls 29 of the cover member 12 and the inner surfaces of the body 30 of the sealing unit or member 29 (FIG. 5).

A modified form of the reinforcing members or ribs 16–17–21–23–24 is shown in FIG. 9. In this form of the invention the reinforcing members or ribs, one of which is generally indicated at 35, are formed of solid materials such, for example, as unidirectional glass roving impregnated with a suitable resin such, for example, as polyester resin, such as used for the construction of the base 11 and cover member 12, and the reinforcing members or ribs 53 may be either molded separately from the walls of the cover member 12 or base 11 and adhesively secured thereto, or they may be molded integrally therewith, as desired. Thus, each of the reinforcing members or ribs 35, as shown, includes a solid body portion 36 having outwardly extending flanges 37 which may be adhesively secured to a wall, such as 13, of the cover member 11 or the flanges 37 may be molded integrally with the wall, as 13, if desired.

If desired, the channels formed by the members 25–26 may be filled with some lightweight water-resistant foamed plastic filler material, such, for example, as polyurethane, phenolic or urea resins, to provide additional structural support for the base 11, over and above that provided by the parts 25–26, and to provide additional water-resistance. Such an arrangement is illustrated in FIG. 10 of the drawings in which those parts which are the same as corresponding parts in the form of the invention illustrated in FIGS. 1 to 8, inclusive, have been given the same reference numerals followed by the additional and distinguishing reference character a, the unit or resistant filler material being indicated at 38.

It has been found in the use of the new lightweight burial vault 10 that the reinforcing members or ribs 21–23–24 on the cover member 12 and the reinforcing members or ribs 16–17 on the box-like portion or base 11 of the vault provide adequate structural or flexural strength to resist the crushing and bending forces to which the new burial vault may be subjected in a grave opening due to the weight of the overlying earth load and the weight of the earth-handling machinery passing thereover, as well as to the bending forces or stresses applied to the side walls of the vault and particularly those which may occur when an additional grave opening may be dug adjacent to the new burial vault interred in a grave opening. At the same time the reinforcing members or ribs 21–23–24 in the cover member 12 and the reinforcing members on ribs 16 and 17 in the base 11 minimize the weight of those parts, which, at the same time, afford adequate structural and flexural strength to the cover member 12 and the base 11, respectively.

It has likewise been found that the sealing arrangement provided by the novel H-shaped sealing unit or member 29, in cooperation with the side walls 19 and end walls 20 of the cover member 12, and the side walls 13 and end walls 14 of the box-like portion or base 11 of the vault 10, and the novel inwardly extending integrally formed flanges 27 in the side walls 13 and end walls 14 of the base 11 and the inwardly extending integrally molded flanges 28 on the side walls 19 and end walls 20 of the cover member 12, with the parts arranged and sealed as shown in FIG. 5, provides an efficient hermetic seal which effectively prevents the ingress of water and other fluid into the vault from the grave opening.

Likewise, it has been found that the provision of the hollow and generally channel-shaped supporting members or feet 25 on the raised centrally arranged portion 32 of the bottom wall 15 of the base 11 of the vault 10 keeps the main raised centrally arranged portion 34 of the bottom wall 15 of the base 11 raised somewhat above the surface of the ground at the bottom of the grave opening, so that in the event that sharp-edged small stones, pebbles or the like are disposed in the bottom of the grave opening, the force of the overlying weight of the earth in the grave opening, and the weight of earth-handling machinery moving thereover, will not bear down through the vault and the raised centrally arranged portion 32 thereof onto such pebbles or stones with resulting tendency to crush, perforate, or puncture the raised centrally arranged portion 34 of the bottom wall 15 of the box-like body portion or base 11 of the vault.

It has further been found that the provision of the water-resistant resin-impregnated glass sealing members 26 in the hollow supporting feet 25 on the bottom wall 15–32 of the base 11 will effectively prevent the ingress of water into the base 11 of the vault 10 in the event that the corresponding supporting foot 25 associated therewith should become punctured as by pressure on a stone, pebble or the like disposed at the bottom of the grave opening.

It has also been found that since the outer surfaces of the new vault are molded against the mold and in such a manner that they are smooth and are protected by a smooth surface of non-porous gel resin the resistance of the outer surface of the vault to chemical corrosion or deterioration under the action of the soil components, when the vault is in a grave opening, is greatly enhanced.

It has also been found that the new vault is so designed and constructed that it has a substantially smooth uninterrupted outer surface with a minimum of overhanging and outwardly protruding surfaces, or parts on its outer surface, thereby making possible the maximum utilization of space in the grave opening while, at the same time, minimizing the likelihood of damage to the vault during the digging of an adjacent grave opening by power digging equipment when the new vault is in a grave opening. Thus, it will be noted that the only outwardly, protruding part on the outer surface of the assembled vault is that portion of the sealing unit or member 29 which projects outwardly from the vault at the point where the cover member 12 is sealed to the base 11 (FIGS. 1, 3, 4, 5 and 6).

The number of the reinforcing members or ribs, such as 16–17–21–23–24, and similar parts, may be increased, depending, in part, on the weight of the overlying load the vault is expected to carry in use, the depth at which it will be interred, and other fatcors.

It will thus be seen from the foregoing description, considered in conjunction with the accompanying drawings, that the present invention provides a new and improved lightweight synthetic plastic resinous burial vault, having the desirable advantages and characteristics, and accomplishing its intended objects, including those hereinbefore pointed out and others which are inherent in the invention.

We claim:

1. A top seal burial vault formed of lightweight plastic resinous materials and comprising a base including side walls and end walls including inner and outer surfaces and having upper edge portions, and a bottom wall, said base having an open top, a cover member for the said base including side walls and end walls including inner and outer surfaces and having lower edge portions arranged adjacent to and extending substantially parallel to and in coplanar relationship with the said upper edge portions of the said side walls and end walls of the said base, the said upper edge portions of the side walls and end walls of the base having an inwardly extending horizontal flange formed integrally therewith, and the said lower edge portions of the side walls and end walls of the cover member having an inwardly extending horizontal flange formed integrally therewith, means for sealing the said cover member to and upon the said upper edge portions of the side walls and end walls of the base, said sealing means comprising a generally H-shaped sealing member arranged between the upper edge portions of the side walls and the end walls of the said base and the lower edge portions of the side walls and end walls of the said cover member and including spaced parallel side wall portions arranged outwardly of the said upper edge portions of the side walls and end walls of the base and outwardly of the said lower edge portions of the side walls and end walls of the cover member, the said generally H-shaped sealing member including a transversely extending web portion extending between the said parallel side wall portions of said sealing member between the upper and lower edges of the said sealing member, said web portion of the sealing member disposed between and in contact with the said inwardly and horizontally extending flanges of the said side walls and end walls of the base and the inwardly and horizontally extending flanges of the cover member, said cover and base member each including a plurality of channel-shaped hollow reinforcing members attached to the inner surface only thereof.

2. A burial vault as defined in claim 1, in which water-resistant sealing material is arranged within the said sealing member and between the said spaced parallel side wall portions thereof and around the said upper edge portion of the said side and end walls of the base and the lower edge portions of the said side and end walls of the cover member disposed therein.

3. A burial vault as set forth in claim 1 wherein the said bottom wall of said base includes an integral raised centrally arranged casket supporting portion surrounded by a horizontally extending and generally channel-shaped hollow ground engaging and supporting member, said member formed integrally with the said raised centrally arranged portion and with the side wall of said base, said generally channel-shaped hollow supporting members of the bottom wall having an open upper end communicating with the interior of the base of the said vault, and the said open upper end of each of said generally channel-shaped hollow supporting members being closed by a generally inverted U-shaped member arranged in and secured in each of the said generally channel-shaped hollow supporting members.

4. A burial vault as defined in claim 1 wherein said channel-shaped reinforcing members include a central body portion with spaced legs extending therefrom, said spaced legs attached to said inner surface, said central body portion being substantially parallel to a plane containing the said cover flange.

5. A burial vault as defined in claim 1 in which the end walls of the said cover member have a centrally arranged generally channel-shaped longitudinally extending hollow reinforcing member thereon on the inner surface thereof and extending right angularly relative to the said transversely extending generally channel-shaped longitudinally extending reinforcing members and between the outermost ones of the latter and the end walls of the said cover member.

6. A burial vault formed of lightweight plastic resinous materials and comprising a base including side walls having upper edge portions, end walls having upper edge portions, and a bottom wall, and said base having an open top, a cover member for the said base, means for sealing the said cover member to and upon the said upper edge portions of the said side walls and end walls of the said base, said sealing means comprising a substantially H-shaped sealing member coextensive with the said upper edge portions of the said side walls and the said end walls of the said base and including spaced parallel side wall portions and a transversely extending web portion extending between the said parallel side wall portions of said sealing member between the upper and lower edges of the said sealing member and resting upon the said upper edge portions of the said side walls and end walls of the said base, the said cover member including side walls and end walls having lower edge portions extending downwardly between the said spaced parallel side wall portions of the said substantially H-shaped sealing member and resting upon the upper surface of the said transversely extending web portion of the said sealing member, the said base and the said cover member having substantially smooth uninterrupted outer surfaces which are substantially free of outwardly projecting or protruding parts, the said upper edge portions of the side walls and of the said end walls of the said base of said vault having an inwardly extending horizontal flange formed integrally therewith, the said lower edge portions of the side walls and of the said end walls of said cover member having an inwardly extending horizontal flange formed integrally therewith, the said transversely extending web portion of said sealing member being disposed between the said inwardly and horizontally extending flanges of the said base and the said cover member, water-resistant sealing material being arranged within the said sealing member and between the said spaced parallel side wall portions thereof and around the said upper edge portion of the said side and end walls of the said base and the lower edge portions of the said side and end walls of the said cover member disposed therein, the base and cover member each including a plurality of channel-shaped hollow reinforcing members, each of said generally channel-shaped hollow reinforcing members including a main central body portion having laterally diverging side wall portions and free end portions, the said diverging side wall portions of the said reinforcing members for the said base and for the said cover member terminating at their longitudinally extending outer edges in flange portions which are joined to the said walls of the said base and of the said cover member, respectively, on the inner surfaces thereof, said free end portions of said reinforcing members on said cover and base members abutting the said inwardly extending horizontal flange of the base and cover member respectively, and the said cover member having a centrally arranged generally channel-shaped longitudinally extending hollow reinforcing member thereon on the inner surface thereof and extending right-angularly relative to the said transversely extending generally channel-shaped longitudinally extending reinforcing members and between the outermost ones of the latter and the end walls of the said cover member and downwardly and centrally over one of the said end walls of the said cover member on the inner surface of the said cover member.

7. A burial vault as set forth in claim 6 wherein the said bottom wall of said base includes an integral raised centrally arranged casket supporting portion surrounded by a horizontally extending and generally channel-shaped hollow ground engaging and supporting member, said member formed integrally with the said raised centrally arranged portion and with the side wall of said base, said generally channel-shaped hollow supporting members of the bottom wall having an open upper end communicating with the interior of the base of the said vault, and the said open upper end of each of said generally channel-shaped hollow supporting members being closed by a generally inverted U-shaped member arranged in and secured in each of the said generally channel-shaped hollow supporting members.

References Cited by the Examiner

UNITED STATES PATENTS

| | | | |
|---|---|---|---|
| 852,080 | 4/07 | Russell | 50—95 X |
| 1,199,325 | 9/16 | Wallace | 27—7 |
| 1,469,220 | 10/23 | Kemp | 50—268 X |
| 1,928,672 | 10/33 | Mitchell | 27—35 |
| 2,026,428 | 12/35 | Murphy et al. | 27—6 |
| 2,093,809 | 9/37 | Holme | 50—94 X |
| 2,247,617 | 7/41 | Metz | 50—85 X |
| 2,806,278 | 9/57 | Crump | 50—268 X |
| 2,870,793 | 1/59 | Bailey. | |
| 2,885,070 | 5/59 | Ondrejka | 220—4 X |
| 2,912,848 | 11/59 | Lee et al. | 50—127 |
| 2,916,797 | 12/59 | McCombs | 27—35 |
| 2,940,156 | 6/60 | Cook | 27—35 |
| 2,974,390 | 3/61 | Nelson | 27—7 |
| 2,982,054 | 5/61 | Anderson | 50—116 X |

FOREIGN PATENTS 859,941  1/61  Great Britain.

OTHER REFERENCES

German printed application No. 1,008,471, May 16, 1957.

FRANK L. ABBOTT, *Primary Examiner.*

JACOB L. NACKENOFF, *Examiner.*